FEED-FORWARD AMPLIFIER

Filed Dec. 26, 1967 4 Sheets-Sheet 1

INVENTOR
H. SEIDEL
BY
Sylvan Sherman
ATTORNEY

Oct. 7, 1969 H. SEIDEL 3,471,798

FEED-FORWARD AMPLIFIER

Filed Dec. 26, 1967 4 Sheets-Sheet 3

Oct. 7, 1969 H. SEIDEL 3,471,798

FEED-FORWARD AMPLIFIER

Filed Dec. 26, 1967 4 Sheets-Sheet 4

United States Patent Office 3,471,798

Patented Oct. 7, 1969

3,471,798
FEED-FORWARD AMPLIFIER

Harold Seidel, Warren Township, Somerset, N.J., assignor to Bell Telephone Laboratories, Incorporated, Murray Hill, N.J., a corporation of New York Filed Dec. 26, 1967, Ser. No. 693,546
Int. Cl. H03f 1/26, 3/68, 1/00
U.S. Cl. 330—149 6 Claims

ABSTRACT OF THE DISCLOSURE

This application describes a feed-forward compensated amplifier circuit in which the amplified signal is compared with a time-shifter reference signal and the error component of the amplified signal isolated. The error component, which includes both noise and distortion components introduced by the main amplifier, is then amplified by means of a high quality subsidiary amplifier and added, in turn, to the time-shift amplified signal in such phase as to minimize the error in the output signal.

To minimize errors due to impedance mismatch in the amplifier circuit, hybrid coupler power dividers are used. To minimize noise in the output signal due to the subsidiary amplifier, the portion of input signal coupled to the subsidiary amplifier is larger than that coupled to the main amplifier.

Most efficient utilization of the power in the amplified signal and in the error signal is realized by using a reactive three-port to match the main signal path and the error signal path to the output load.

This invention relates to impedance-matched, high-power, low-noise amplifiers.

BACKGROUND OF THE INVENTION

The development of a high-power amplifier stands or falls on the ability of the designer to devise a proper error-correcting system, where the term "error" shall be understood to include noise as well as other types of distortion. H. S. Black, in United States Patent 1,686,792, issued Oct. 9, 1928, and in United States Patent 2,102,671, issued Dec. 21, 1937, disclosed both "feed-forward" and "feed-back" techniques as error-correcting means. Within the scope of his disclosures, both techniques are adequate within 180 degrees of phase.

With an occasional, but short lived, resurrection, feed-forward fell into general disuse until independently revived by B. McMillan (United States Patent 2,748,201, issued May 20, 1956) and J. J. Zaalberg van Zelst (Phillips Technical Review, 9, 1947, pages 25–32). These were followed by further activities by M. O. Deighton, E. H. Cooke-Yarborough and G. L. Miller ("A Method of Enhancing the Transient Response Stability of Fast Transistor Amplifier Systems," Digest of Technical Papers, International Solid-State Circuits Conference, February 1965) and J. J. Golembeski et al. ("A Class of Minimum Sensitivity Amplifiers," Institute of Electrical and Electronic Engineers Transactions on Circuit Theory, March 1967, pages 69–74). The essence of the McMillan and van Zelst disclosures is to combine both techinques of Black by simultaneously providing feed-back and feed-forward frequency-shaping networks. Their aim is to provide channel redundancy as well as parameter desensitization. Deighton et al., utilize a feed-forward arrangement to stabilize a particular circuit of a pulse amplifier, while Golembeski, after representing a generalized parallel channel configuration, develops a synthesis procedure, and sets forth realizability conditions. None, however, fully appreciate the significance of time in a feed-forward configuration and the consequences that flow from this appreciation.

Basically, feed-back, which have been employed with much success, attempts a causal contradiction: after an event has occurred, feed-back attempts to reshape the cause. This inconsistency is resolved only by time-smearing the event to blur the distinction between "before" and "after" to an adequate degree. This smearing, however, gives rise to other problems in that it requires a prescribed control of the spectral response, an art too well known to require further comment.

SUMMARY OF THE INVENTION

Feed-forward, in accordance with the present invention, evolves from entirely different premises which totally avoid the casual anomaly referred to hereinabove. Instead of seeking to reverse time, the passage of time is fully recognized. Error is determined in relation to a time-shifted reference and corrected in a time sequence that is compatible with the main signal. No obscuration of time is permitted, and frequency shaping to attain stabality is irrelevant.

The fact that frequency shaping (i.e., control of the return ratio function) is irrelevant, is of major importance. A feed-back amplifier consumes a good portion of its gain-bandwidth figure of merit in controlling the return ratio well beyond the band of interest in order to prevent instability. Feed-forward suggests no such loss.

In general, a feed-forward system has three strikingly important features.

(1) Feed-forward correction does not reduce amplifier gain.

(2) Gain-bandwidth is consumed entirely within the band of interest.

(3) Feed-forward realization is independent of the magnitude or shape of the amplifier delay and exists in general.

In accordance with the invention, a feed-forward correction system comprises two parallel wavepaths. One path, called the main signal path, includes one or more signal amplifiers and operates upon the signal in the usual manner. The second path, called the error signal path, accumulates the errors introduced into the signal as it progresses along the main path. These error components are accumulated at a level and in proper time sequence relative to the main signal so that they can be injected into the main signal path at any time in a manner to cancel the main signal error components.

A rudimentary recognition of the concept of time flow is disclosed in German Patent 1,085,194, issued July 14, 1960. However, to utilize this concept properly, the circuit must be capable of distinguishing between the transit of incident energy through any portion of the circuit and multiple, bidirectional transits through such portions due to reflections. To avoid any ambiguity in this regard, the circuit is advantageously designed to sense wave flow in only the forward direction and, where necessary, to insure that such flow results only from the incident wave. This requires the use of power dividers that are both directionally sensitive and impedance-matched. Thus, in accordance with one aspect of the present invention, sampling of the reference signal and sampling of the main signal path signal are done by means of hybrid junctions. Injection of the error signal into the main signal path, on the other hand, is by means of a reactive three-port, such as a transformer.

Improved noise performance is realized by coupling a larger portion of the input (reference) signal into the error path than is coupled into the main signal path. This, coupled with the use of high-quality, low-power, low-noise subsidiary amplifiers in the error signal path, produces a low-noise, error-correcting signal.

It is to be emphasized that the subsidiary amplifier in the error wavepath of a feed-forward system has an entirely different function in noise reduction than does an amplifier used as a conventional preamplifier. In the latter usage, the preamplifier must be capable of handling the entire signal range. This, intrinsically, limits the dynamic range of the system. The subsidiary amplifier in a feed-forward system, on the other hand, handles only the spontaneous error which is equivalent to a negligible portion of the coherent signal range. Accordingly, the dynamic range of the subsidiary amplifier has virtually no relationship to the dynamic range of the system it controls.

Since in any system correction is not perfect, further improvement can be realized in either one of two modifications of the basic circuit. The first modification treats the entire feed-forward system as an amplifier and provides a second, parallel error signal path which further corrects the "corrected" amplifier. A second modification provides an error wavepath in parallel with the subsidiary amplifier to improve the performance characteristics of the latter.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
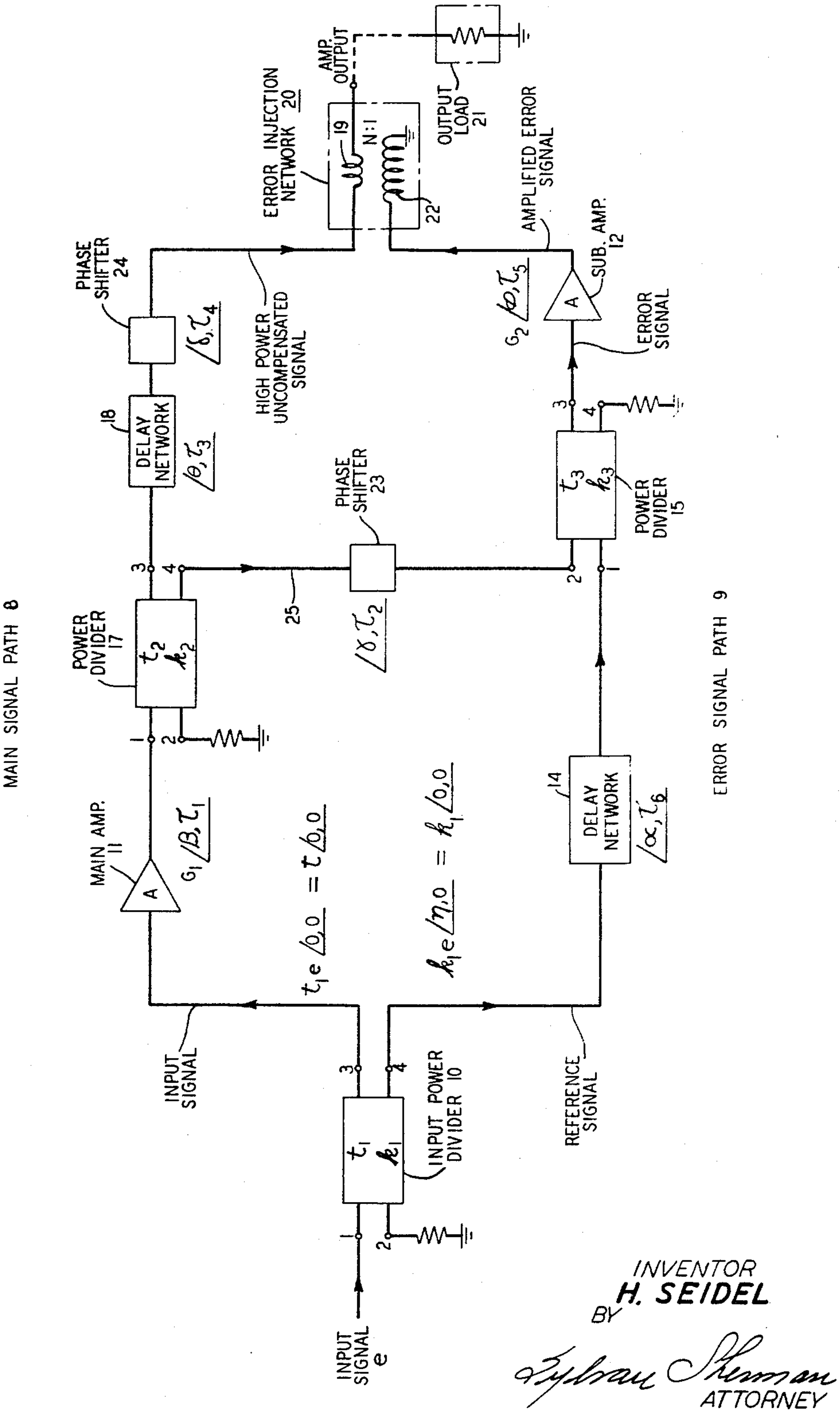
FIG. 1 shows a feed-forward compensated amplifier circuit in accordance with the invention.

Referring to the drawings, FIG. 1 shows, in block diagram, a feed-forward compensated amplifier circuit in accordance with the invention. The circuit comprises an input power divider 10, an output error injection network 20, and a pair of interconnected parallel transmission paths 8 and 9 connected therebetween. The first of these paths 8 is the main signal path which includes, in cascade, the main amplifier 11, a power divider 17, a delay network 18 and a phase shifter 24. The second path 9, designated the error signal path, includes, in cascade, a delay network 14, a power divider 15 and a subsidiary amplifier 12. An interconnecting wavepath 25, including a phase shifter 23, couples power divider 17 to power divider 15. Trimmer attenuators, though not shown, are conveniently included to adjust signal levels.

As indicated hereinabove, it is the broad purpose of the circuit arrangement of FIG. 1 to minimize any error introduced into the signal by the main amplifier. For purposes of illustration, the latter can be regarded as a relatively noisy, high-gain, high-power amplifier comprising one or more cascaded stages, or a plurality of stages arranged in a fan-out as described, for example, in my copending application Ser. No. 632,058, filed Apr. 14, 1967. Being a high-power amplifier, it can be further anticipated that it will be characterized by an input-output characteristic that is more nonlinear than might be desired. Thus, the term "error" as used herein shall be understood to include all spurious energy components introduced by the amplifier including both noise and distortion components.

For purposes of explanation, a midband phase shift and a time delay, $\tau$, equal to the slope of the phase characteristic, are assigned to each of the circuit components. Thus, for example, delay network 14 is characterized by a midband phase shift $\alpha$ and a time delay $\tau_6$ over the band of interest. Hence the designation $\underline{/\alpha,\tau_6}$ is associated with delay network 14. In addition, each of the amplifiers is characterized by a gain factor $G_1$ and $G_2$.

In operation an input signal, $e$, is applied to input terminal 1 of power divider 10 wherein it divides into two unequal components $t_1e\underline{/0,0}$ and $k_1e\underline{/\eta,0}$. The divider can, in general, be any one of the many kinds of hybrid junctions known in the art that are capable of dividing a signal into two, unequal parts. This includes a large variety of couplers such as the Riblet coupler (H. J. Riblet "The Short-Slot Hybrid Junction," Proceedings of the Institute of Radio Engineers, February 1952, pages 180–184), the multihole directional coupler (S. E. Miller, "Coupled Wave Theory and Waveguide Applications," Bell System Technical Journal, May 1954, pages 661–719), the semi-optical directional coupler (E. A. J. Marcatili, "A Circular Electric Hybrid Junction and Some Channel-Dropping Filters," Bell System Technical Journal, January 1961, pages 185–196), the strip transmission line directional coupler (T. K. Shimizu "Strip-Line 3 db Directional Coupler," 1957 Institute of Radio Engineers, Wescon Convention Record, vol. 1, part 1, pages 4–15), and the lumped-element quadrature hybrids solid by Merrimac Research and Development, Incorporated, as advertised, for example, in the September 1966 issue of Microwave Journal. In each of the above-mentioned power dividers, there is a 90 degree relative phase difference between the two output signal components, hence the designation "quadrature" coupler or "quadrature" hybrid. In addition, such couplers can be designed to have any desired power division ratio.

Alternatively, a so-called "in-phase" or "180 degree" coupler of the type disclosed in my copending application Ser. No. 636,915, filed May 8, 1967, can be used. This latter type of couple is assymmetrical in that the two output signal components are either in phase, or 180 degrees out of phase, depnding upon which terminal the input signal is coupled to. Which particular type of coupler is used in any specific application depends upon the signal frequency and other system considerations, such as size and cost.

Typically, the two signal components derived from divider 10 can be either in phase, 180 degrees out of phase, or in phase quadrature. To simplify the following explanation, however, the input signal is assumed to be of unit amplitude, i.e., $e=1$, and all of the power dividers, 10, 15 and 17 are assumed to be in-phase dividers, i.e., $\eta=0$.

The larger of the two signals derived from divider 10, $k_1\underline{/0,0}$ is coupled to delay network 14 where it undergoes an additional phase delay $\alpha$ and a time delay $\tau_6$. The resulting signal $k_1\underline{/\alpha,\tau_6}$ is then applied to terminal 1 of power divider 15 wherein it is again divided into two unequal components $t_3k_1\underline{/\alpha,\tau_6}$ and $k_3k_1\underline{/\alpha,\tau_6}$. The latter component is dissipated in the terminating resistor connected to terminal 4 of divider 15, whereas component $t_3k_1\underline{/\alpha,\tau_2}$ appears at terminal 3 of divider 15.

Similarly, signal component $t_1/\underline{0,0}$ proceeds along a parallel path to terminal 3 of divider 15 by way of amplifier 11, power divider 17 and phase shifter 23. The following Table I gives the amplitude and phase of the signals at various locations between divider 10 and secondary amplifier 12.

TABLE I

| Location: | Signal |
|---|---|
| Terminal 3, divider **10** | $t_1/\underline{0,0}$ |
| Output, main amplifier | $G_1t_1/\underline{\beta,\tau_1}+\Delta/\underline{\epsilon,\tau_1}$ |
| Terminal 4, divider **17** | $G_1t_1k_2/\underline{\beta,\tau_1}+\Delta k_2/\underline{\epsilon,\tau_1}$ |
| Terminal 2, divider **15** | $G_1t_1k_2/\underline{\beta+\gamma,\tau_1+\tau_2}+\Delta k_2/\underline{\epsilon+\gamma,\tau_1+\tau_2}$ |
| Terminal 3, divider **15** | $G_1t_1k_2k_3/\underline{\beta+\gamma,\tau_1+\tau_2}+\Delta k_2k_3/\underline{\epsilon+\gamma,\tau_1+\tau_2}$ |
| Terminal 4, divider **10** | $k_1/\underline{0,0}$ |
| Terminal 1, divider **15** | $k_1/\underline{\alpha,\tau_6}$ |
| Terminal 3, divider **15** | $k_1t_3/\underline{\alpha,\tau_6}$ |

Because amplifier 11 is both noisy and nonlinear, the output signal derived from amplifier 11 contains spurious signal components which, in Table I, are included in an error signal $\Delta/\underline{\epsilon,\tau_1}$. It is a component of this error signal $\Delta k_2k_3/\underline{\epsilon+\gamma,\tau_1+\tau_6}$, that is to be isolated and then coupled back into the main signal path in such a manner as to cancel the component of error signal in the main signal path.

Isolation of the error signal is accomplished by adjusting the amplitudes, phases and time delays associated with the amplified signal $G_1t_1k_2k_3/\underline{\beta+\gamma,\tau_1+\tau_2}$ and with the reference signal $k_1t_3/\underline{\alpha,\tau_6}$ such that $$G_1t_1k_2k_3=k_1t_3 \qquad (1)$$

$$\beta+\gamma-\alpha=\pi \qquad (2)$$

and $$\tau_1+\tau_2=\tau_6 \qquad (3)$$

Under these conditions, these two signal components are equal in amplitude, are in the same time domain, but are 180 degrees out of phase. Accordingly, they cancel leaving only the relatively small error signal $$\Delta k_2k_3/\underline{\epsilon+\gamma,\tau_1+\tau_2}$$

at the input to the subsidiary amplifier.

The error signal, thus isolated, is amplified by the subsidiary amplifier and coupled back into the main signal path by means of error injection network 20. Simultaneously, the amplified signal and its associated error component propagate along the main signal path 9 to the error injection network. Table II is a tabulation of the various signal and error components at various locations between power divider 17 and the output load.

TABLE II

| Signal | Location: |
|---|---|
| Terminal 3, divider **17** | $G_1t_1t_2/\underline{\beta_1\tau_1}+t_2\Delta/\underline{\epsilon_1\tau_1}$ |
| Output delay network **18** | $G_1t_1t_2/\underline{\beta+\Theta,\tau_1+\tau_3}+t_2\Delta/\underline{\epsilon+\Theta,\tau_1+\tau_3}$ |
| Output phase shifter **24** | $G_1t_1t_2/\underline{\beta+\Theta+\delta,\tau_1+\tau_3+\tau_4}+t_2\Delta/\underline{\epsilon+\Theta+\delta,\tau_1+\tau_3+\tau_4}$ |
| Output load | $G_1t_1t_2T/\underline{\beta+\Theta+\delta,\tau_1+\tau_3+\tau_4}+t_2T\Delta/\underline{\epsilon+\Theta+\delta,\tau_1+\tau_3+\tau_4}$ |
| Input to subsidiary Amp **12** | $k_2k_3\Delta/\underline{\epsilon+\gamma,\tau_1+\tau_2}$ |
| Output from subsidiary Amp **12** | $G_2k_2k_3/\underline{\epsilon+\gamma+\varphi,\tau_1+\tau_2+_5}$ |
| Output load | $1/N\ (G_2\Delta k_2k_3)/\underline{\epsilon+\gamma+\varphi,\tau_1+\tau_2+\tau_5}$ |

Error cancellation is achieved by adjusting the gain, $G_2$, the time delays and the phases of the two error signal components at the output load such that $$t_2T\Delta=\frac{1}{N}G_2k_2k_3\Delta$$

or $$Tt_2=\frac{G_2k_2k_3}{N} \qquad (4)$$

$$\tau_1+\tau_3+\tau_4=\tau_1+\tau_2+\tau_5$$

$$\tau_3+\tau_4=\tau_2+\tau_6 \qquad (5)$$

and $$\epsilon+\gamma+\varphi-(\epsilon+\theta+\delta)=\pi$$

or $$\gamma+\varphi-\theta-\delta=\pi \qquad (6)$$

where T is the insertion loss of transformer 20 given by $$T=\frac{1}{1+\frac{1}{2N}}$$

With the amplifier adjusted in accordance with Equations 1 through 6, any error signal, $\Delta$, introduced by the main amplifier is minimized at the load, resulting in a substantially noisefree, distortionless output signal $G_1t_1t_2T$.

It is apparent from the preceding discussion that proper error cancellation requires a recognition of the error component in the amplified signal, its isolation and, finally, its injection into the main signal path. In addition, all these steps must be done with proper recognition of the passage of time. As indicated earlier, however, this can only be realized by means of power dividers that are directionally sensitive. For example, if power divider 17 cannot distinguish between incident and reflected waves, the signal coupled to power divider 15 would, in the presence of an impedance mismatch, include portions of both. As a consequence, the error signal coupled to the subsidiary amplifier would include spurious error components unrelated to any actual error components in the signal.

To avoid the above-described difficulties, the power dividers are advantageously hybrid junctions of the types referred to hereinabove. That is, the power dividers are both sensitive to the direction of wave flow and are impedance-matched to the rest of the transmission system. So designed, a feed-forward amplifier is relatively tolerant of mismatches in the amplifiers. On the other hand, by failing to satisfy these two conditions, the degree of match of the amplifiers become a limiting factor in the excellence of the error correction that can be realized.

It will be recognized that in the embodiment of FIG. 1 no compensation is provided for noise and/or distortion introduced by the subsidiary amplifier 12. Generally, this is not necessary since the subsidiary amplifier is a relatively small, low-power amplifier. As such it inherently has a much lower noise figure than the high-power main amplifier. In addition, being a low-power amplifier, it can readily be designed for high quality performance. However, further error compensation, which does include compensation for error introduced by the subsidiary amplifier, can be achieved, where required, by means of multiple feed-forward amplifier circuits of the types shown in FIGS. 2 and 3.

Figure 2:
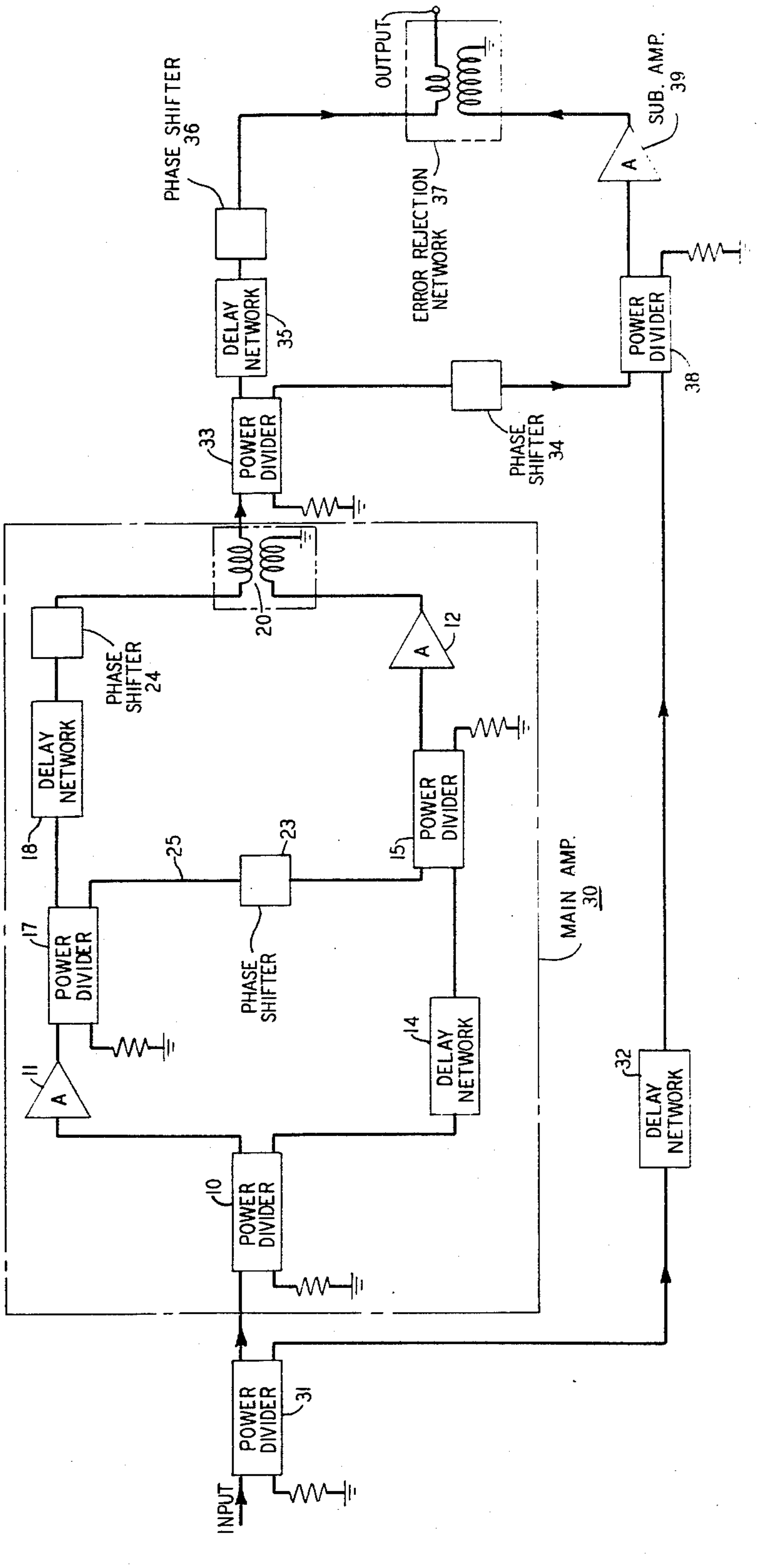
FIGS. 2 and 3 show multiple-loop feed-forward amplifier circuits in accordance with the invention.

In the embodiment of FIG. 2, the entire feed-forward compensated amplifier of FIG. 1 is considered to be the "main" amplifier which is to be feed-forward compensated. Thus, as above, the input signal is divided into two components by a power divider 31. A portion of the larger component is coupled to subsidiary amplifier 39 by way of delay network 32 and power divider 38. The other component is coupled to main amplifier 30 which comprises the entire circuit of FIG. 1, the components of which are identified by the same identification numerals as in FIG. 1. A portion of the first-order compensated output from amplifier 30 is coupled through power dividers 33 and 38, and phase shifter 34 to amplifier 39. The remaining portion is coupled to the output load through delay network 35, phase shifter 36 and transformer 37. The isolated error signal, as above, is amplified in subsidiary amplifier 39, and also coupled to the output load in a manner to cancel the error component in the main signal. Thus, the operation of the multiple loop amplifier of FIG. 2 is the same as outlined above in connection with FIG. 1.

Figure 3:
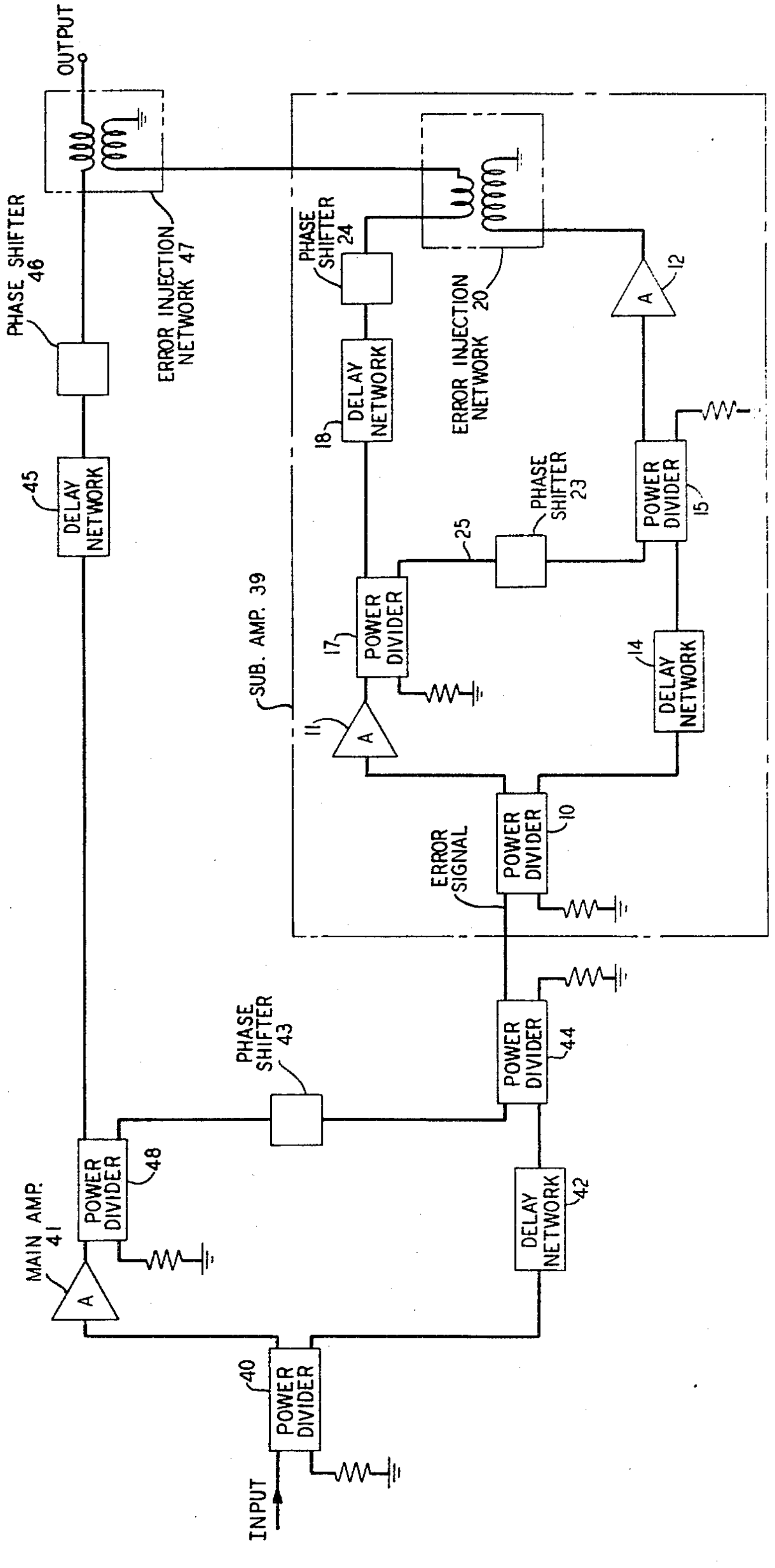

In the second multiple loop embodiment, illustrated in FIG. 3, the subsidiary amplifier is considered to be the "main" amplifier of a secondary feed-forward loop. The resulting compensated amplifier then functions as a compensated subsidiary amplifier in the primary feed-forward loop. Thus, in FIG. 3, the input signal is divided into two components by a power divider 40. A portion of the larger component is coupled to a subsidiary amplifier 49 by means of a delay network 42 and a power divider 44. A portion of the other signal component is also coupled to subsidiary amplifier 49 by means of main amplifier 41, power divider 48, phase shifter 43, and power divider 44. The resulting error signal obtained is then the input signal to a secondary feed-forward system comprising a network of the type illustrated in FIG. 1. This similarity is again emphasized by using the same identification numerals as were used in FIG. 1 for the components comprising the compensated subsidiary amplifier 49. The amplified error signal derived from the compensated subsidiary amplifier 49 is injected into the main signal path by means of error injection network 47. The main signal is also coupled to network 47 by means of delay network 45 and phase shifter 46.

Which one of these two multiple-loop feed-forward amplifiers is used in any particular instance would depend upon many factors since each amplifier has specific advantages and disadvantages. For example, in the embodiment of FIG. 3 only one error determination and correction is made. This places a restrictive tolerance on the circuit components in order to satisfy the requirements of Equations 1 through 6. On the other hand, in the looping progression utilized in the embodiment of FIG. 3, successive subsidiary amplifiers are confronted with a "main" amplifier only one degree higher in power. By contrast, in the looping arrangement of FIG. 2, all subsidiary amplifiers are coupled into the main signal path and, hence, all must be capable of feeding an error correcting signal into the highest power level of the system. On the other hand, in the embodiment of FIG. 2 each successive loop successively corrects the main signal and, therefore, the tolerances on all circuit components are correspondingly relaxed.

In the above discussion, the error injection network 20 has been characterized as a transformer. In the discussion that now follows, the reasons for using a transformer and its design are considered.

In the embodiment of FIG. 1 a hybrid coupler 15 is used to combine a portion of the main signal and the reference signal and thereby isolate the error signal. This would suggest that a hybrid coupler might also be used to combine the amplified error signal and the main signal path signal and, thereby, isolate the useful output signal. Such an error injection network, however, leads to excessive power loss. For example, if the coupler provided equal power division, the main amplifier would sustain a 3 db power loss. If a power division ratio more favorable to the main amplifier is used, the power requirements of the subsidiary amplifier are correspondingly increased. As a matter of fact, the situation can readily be reached in which the subsidiary amplifier is called upon to deliver more power than the main amplifier in order to compensate moderate errors in the latter. Such a situation is clearly inconsistent with the low-noise, low-power preferred characteristics predicated for the subsidiary amplifier. Accordingly, another, more efficient error injection network is required.

Figure 4:
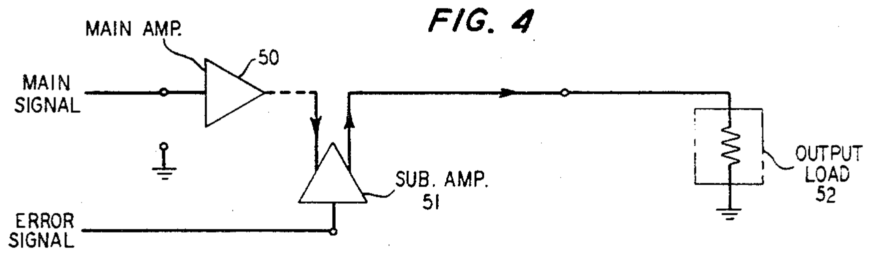
FIG. 4 shows an idealized error injection network.

Ideally, the subsidiary amplifier would be a low-power amplifier having zero output impedance. Such as amplifier could then be connected directly in series with the main signal path as indicated in FIG. 4. In this arrangement, the subsidiary amplifier 51 is connected directly in series between the main amplifier 50 and the output load 52. Since the output impedance of the subsidiary amplifier is zero, none of the output singal is lost in the subsidiary amplifier by such an arrangement. Similarly, the only power delivered by the subsidiary amplifier is that required for error compensation. In such an arrangement, none of the main signal power or of the error signal power is thereby lost in this coupling arrangement.

Recognizing that the subsidiary amplifier has, in fact, a finite output impedance, the idealized coupling arrangement illustrated in FIG. 4 cannot be used. What is sought then is a coupling arrangement in which the subsidiary amplifier, which has a relatively small output power capability, is shielded from the relatively large power output from the main amplifier. At the same time, the shielding must favor the main amplifier so as not to compromise its ability to deliver its full output power to the load.

It might appear that by both shielding the subsidiary amplifier from the main amplifier, and favoring the main amplifier, the already limited power capability of the subsidiary amplifier would be further reduced. However, this difficulty is resolved, in accordance with the invention, by designing a reactive shield with a "leak" which permits the passage of just enough wave energy from the main amplifier to the subsidiary amplifier to cancel the wave energy reflected back to the subsidiary amplifier by the shield. So adjusted no net energy is reflected back to the subsidiary amplifier, and the latter appears to be coupled to a matched load. The subsidiary amplifier is thus able to deliver maximum power when it is called upon to correct the (normalized) peak in-phase error voltage $\Delta_p$. Since the injection network is reactive, the subsidiary amplifier output is, in fact, delivering this power to the output load.

It can also be shown that when the above-described conditions are satisfied, the subsidiary amplifier is, at the same time, capable of absorbing any spurious power, such as noise power, present in the main signal path.

Figure 5:
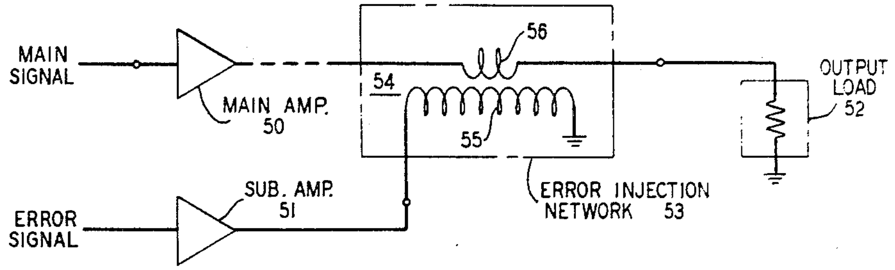
FIG. 5 shows a transformer used in a voltage error injection network in accordance with the invention.

One embodiment of an error injection network capable of satisfying all of the requirements set forth above in an $N$:1 turns transformer 54 connected, as in FIG. 5, to provide voltage error injection. As illustrated, subsidiary amplifier 51 is coupled to the high turns winding 55 and the main amplifier 50 is coupled to the output load 52 through the low turns winding 56.

It can be shown that the optimum transformer turns ratio N is given by $$N=\sqrt{\frac{1-\Delta_p}{\Delta_p}}. \qquad (7)$$

Under this condition, the peak power, $P_s$, delivered by the subsidiary amplifier is $$P_s=\frac{\Delta_p}{1-\Delta_p}Pm \qquad (8)$$

where $P_m$ is the main amplifier peak power.

Since the subsidiary amplifier images a normalized resistance of $1/N^2$ into the main amplifier circuit, the effective normalized output impedance of the main amplifier increases from unity to $1+1/N^2$.

As an example, for a 1 db peak error signal, $\Delta_p=\frac{1}{8}$ and $N=\sqrt{7}$.

Analysis shows other interesting features of the transformer coupler. If, with no feed-forward circuitry present, the relative distortion at peak power is approximately equal to $2\Delta_p$, then:

(1) In the presence of feed-forward, the power gain is depressed by a relative amount approximately equal to $\Delta_p$, so that the power necessary to produce an undistorted output is only $\Delta_p$;

(2) The residual distortion power $\Delta_p$ is contributed by the subsidiary amplifier.

Thus, it is seen that with proper injection, a subsidiary amplifier with relative power capability of approximately $\Delta_p$ can control distortion equal to $2\Delta_p$.

Figure 6:
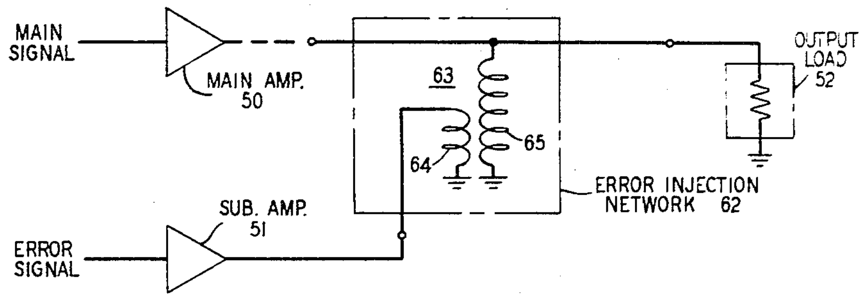
FIG. 6 shows a transformer used in a current error injection network.

FIG. 6 shows an alternate arrangement of a 1:$N$ turns transformer as an error injection network 62. In this embodiment, which employs current injection, the high turns winding 65 of transformer 63 is connected in shunt with the main signal path between main amplifier 50 and output load 52. The subsidiary amplifier 51 is coupled to the low turns winding 64. In all respects, the operation of the injection network of FIG. 6 is the same as that described in connection with FIG. 5.

Figure 7:
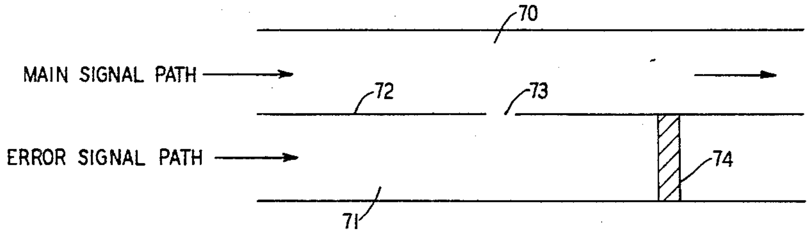
FIG. 7 shows an error injection network using waveguides.

At the higher frequencies, wherein distributed parameter circuits are more suitably employed, error injection in accordance with the invention can be realized by means of the reactive three-port network shown in FIG. 7. In this illustrative embodiment, the main signal path 70 and the error signal path 71 are represented as waveguides sharing a common wall 72 therebetween. Coupling between the wavepaths is by means of an aperture 73 through wall 72. In order to direct all of the wave energy injected into waveguide 71 towards the subsidiary amplifier (not shown), a shorting termination 74 is appropriately located on the far side of aperture 73.

It is interesting to note that the use of a reactive injection network in accordance with the invention, results in only a small loss in gain, but in no loss in output power to the system. Thus, the coupling arrangement of FIGS. 5, 6 and 7, in this latter respect, are equivalent to the idealized error injection network of FIG. 4.

In each of the above-described embodiments the input signal is divided unequally, and the larger of the two components is coupled to the subsidiary amplifier as a reference signal. In view of the fact that this reference signal and the amplified signal derived from the main amplifier are adjusted so that they cancel each other, leaving only the error signal at the subsidiary amplifier, this utilization of the input signal would appear to be wasteful in that a greater gain is now required of the main amplifier for a given output. This, however, is precisely what is sought since a greater main amplifier gain results in a larger error component at the subsidiary amplifier and a resulting improved signal-to-noise ratio at the subsidiary amplifier. Since it is the noise figure of the subsidiary amplifier that ultimately determines the noise performance of the compensated amplifier, one very important advantage of the feed-forward compensation would be lost if the circuit was not adapted to minimize the noise figure of the subsidiary amplifier. Advantageously, the power division ratio is of the order of 10 db or greater, with the larger signal being coupled to the error signal wavepath.

In the embodiments of FIGS. 2 and 3, only one secondary feed-forward loop is employed. It should be understood, however, that additional loops can be included in either or both embodiments, and mixtures of both can be utilized. For example, a compensated subsidiary amplifier 49 of the type illustrated in FIG. 3 can be substituted for subsidiary amplifier 39 in FIG. 2. Similarly, a secondary feed-forward loop of the type illustrated in FIG. 2 can be added to the embodiment of FIG. 3.

Similarly, many changes in the locations of the delay networks and the phase shifters can be effected. All that is required is that the bookkeeping associated with the signal amplitudes, time delays and signal phases at the subsidiary amplifier and at the load be similar to that set forth by Equations 1 through 6. Clearly, the terms in these equations will change with the locations of the delay networks and the phase shifters. However, the result sought is the same. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A feed-forward amplifier for electromagnetic wave signals comprising two parallel wavepaths;

the first of said wavepaths including, in cascade, a main signal amplifier and a first delay network;

the second of said wavepaths including, in cascade, a second delay network and a subsidiary amplifier;

a first power divider for dividing the input signal into two components and for coupling one of said two components to said first wavepath and the other of said components to said second wavepath;

means including second and third power dividers for coupling a portion of the output from said main amplifier to the input of said subsidiary amplifier such that the amplitude, time delay and relative phase of the signals at the input to said subsidiary amplifier are adjusted so that the signals cancel, leaving only error components applied to said subsidiary amplifier;

and means for recombining in said first wavepath the amplified signals from said main amplifier and from said subsidiary amplifier such that the amplitude, time delay and relative phase of the error components in said first wavepath and the error components coupled into said first wavepath from said second wavepath are adjusted so that they substantially cancel leaving essentially an error free output signal;

and means for coupling said output signal to a load;

characterized in that:

said input signal is divided into two unequal components and the larger of said components is coupled to said second wavepath;

and in that said means for recombining said signals comprises a reactive three-port adapted to match said parallel wavepaths to said load.

2. The amplifier according to claim 1 wherein said power dividers are hybrid junctions.

3. The feed-forward amplifier according to claim 1 wherein the power handling ability of said subsidiary amplifier is no greater than one quarter of the power handling ability of said main amplifier.

4. The feed-forward amplifier in accordance with claim 1 wherein said main amplifier is itself a feed-forward amplifier in accordance with claim 1.

5. The feed-forward amplifier in accordance with claim 1 wherein said subsidiary amplifier is itself a feed-forward amplifier in accordance with claim 1.

6. The feed-fordward amplifier in accordance with claim 1 wherein said three-port is a 1:$N$ turns ratio transformer.

References Cited

UNITED STATES PATENTS 2,592,716 4/1952 Lewis ............ 330—151 X

ROY LAKE, Primary Examiner

JAMES B. MULLINS, Assistant Examiner

U.S. Cl. X.R.

330—124, 151

UNITED STATES PATENT OFFICE
CERTIFICATE OF CORRECTION

Patent No. 3,471,798 October 7, 1969

Harold Seidel

It is certified that error appears in the above identified patent and that said Letters Patent are hereby corrected as shown below:

Column 1, include the second and third paragraphs in the Abstract of the Disclosure and move the tapered dash paragraph separator from between the first and second paragraphs to between the third and fourth paragraphs. Column 2, line 13, "have" should read -- has --.

Signed and sealed this 3rd day of February 1970.

(SEAL)
Attest:

Edward M. Fletcher, Jr.
Attesting Officer

WILLIAM E. SCHUYLER, JR.
Commissioner of Patents